US006973727B2

(12) United States Patent
Yao

(10) Patent No.: US 6,973,727 B2
(45) Date of Patent: Dec. 13, 2005

(54) ELECTRIC DRIVING SCISSORS

(76) Inventor: Ching Hsiu Yao, Nan Tou Hsien (TW)

( * ) Notice: Subject to any disclaimer, the term of this patent is extended or adjusted under 35 U.S.C. 154(b) by 0 days.

(21) Appl. No.: 10/762,141

(22) Filed: Jan. 22, 2004

(65) Prior Publication Data
US 2005/0160606 A1    Jul. 28, 2005

(51) Int. Cl.[7] .............................................. B26B 15/00
(52) U.S. Cl. .................................... 30/228; 30/DIG. 1
(58) Field of Search .................... 30/228, 216, DIG. 1, 30/210, 254

(56) References Cited
U.S. PATENT DOCUMENTS 3,631,596 A * 1/1972 Glaus ........................... 30/228
4,173,069 A * 11/1979 Sidenstick et al. ............ 30/228
4,682,416 A * 7/1987 Stolfa ........................... 30/228
6,226,875 B1 * 5/2001 Lii et al. ...................... 30/228

* cited by examiner

Primary Examiner—Douglas D Watts

(57) ABSTRACT

An electric driving scissors provide a high torsion force. The electric driving scissors includes a casing, a motor, a driving disk, a crank, and a cutting unit with a pair of knives. The driving disk, crank and knives of the cutting unit are connected pivotally and eccentrically. The motor is installed with a speed change means so that the rotation speed of the motor can be reduced to a lower speed in the rotary shaft with a higher torsion force. Thereby, a hard object can be cut. Furthermore, by the eccentric hole of the driving disk, the axial hole and pivotal hole at two ends of the crank, the rotary shaft of the motor can rotate, while the crank move linearly. Thereby, the angle of the movable knife of the cutting unit is changeable.

1 Claim, 3 Drawing Sheets

ELECTRIC DRIVING SCISSORS

FIELD OF THE INVENTION

The present invention relates to scissors, and particular to an electric driving scissors, wherein a motor serves to drive two knives of a cutting unit so that the worker can operate the scissor with small power.

BACKGROUND OF THE INVENTION

In the prior art, a pair of scissors have a pair of knives and a pair of handles with a crossing structure. User's palm applies a force to the scissors, but unluckily, this prior art structure can not be operated electrically. However, it is often that people must use scissors to cut hard objects, such as branches of trees or flowers. Thus, the prior art scissors will make a larger load to the worker, but this is improper to children or women or old peoples.

SUMMARY OF THE INVENTION

Accordingly, the primary object of the present invention is to provide an electric driving scissors, wherein a motor serves to drive two knives of a cutting unit so that the worker can operate the scissor with small power.

To achieve above objects, the present invention provides an electric driving scissors which provide a high torsion force. The electric driving scissors includes a casing, a motor, a driving disk, a crank, and a cutting unit with a pair of knives. The driving disk, crank and knives of the cutting unit are connected pivotally and eccentrically. The motor is installed with a speed change means so that the rotation speed of the motor can be reduced to a lower speed in the rotary shaft with a higher torsion force. Thereby, a hard object can be cut. Furthermore, by the eccentric hole of the driving disk, the axial hole and pivotal hole at two ends of the crank, the rotary shaft of the motor can rotate, while the crank move linearly. Thereby, the angle of the movable knife of the cutting unit is changeable.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
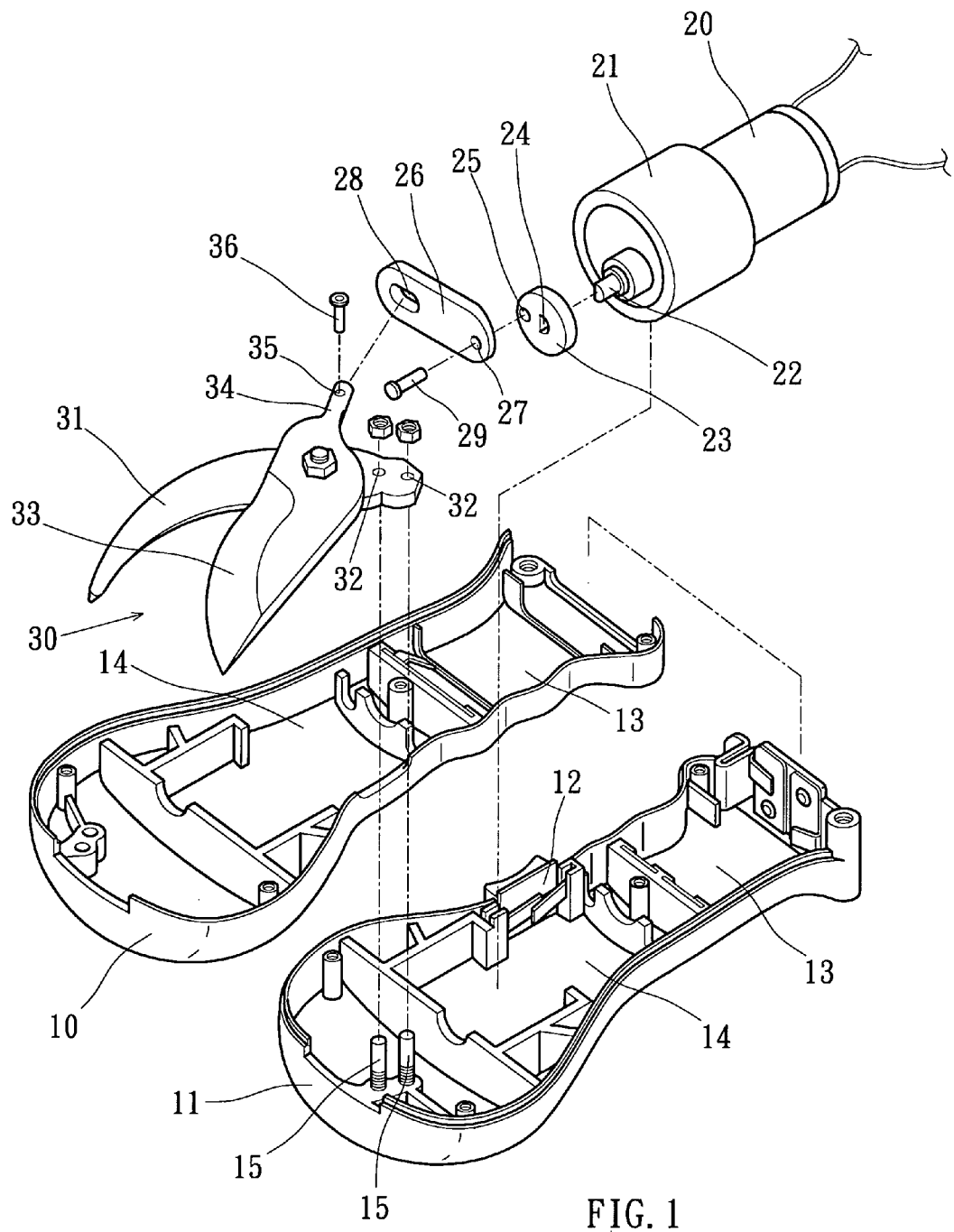
FIG. 1 is an exploded perspective view of the present invention.
Figure 2:
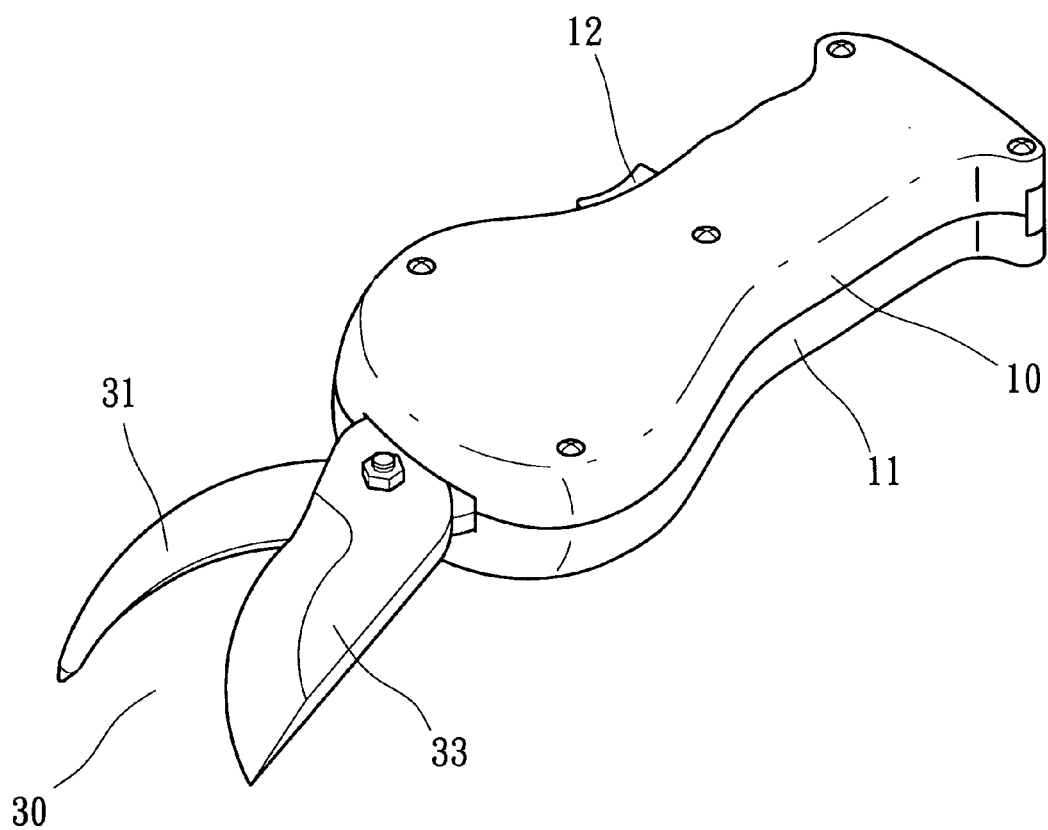
FIG. 2 is an assembled perspective view of the present invention.
Figure 3:
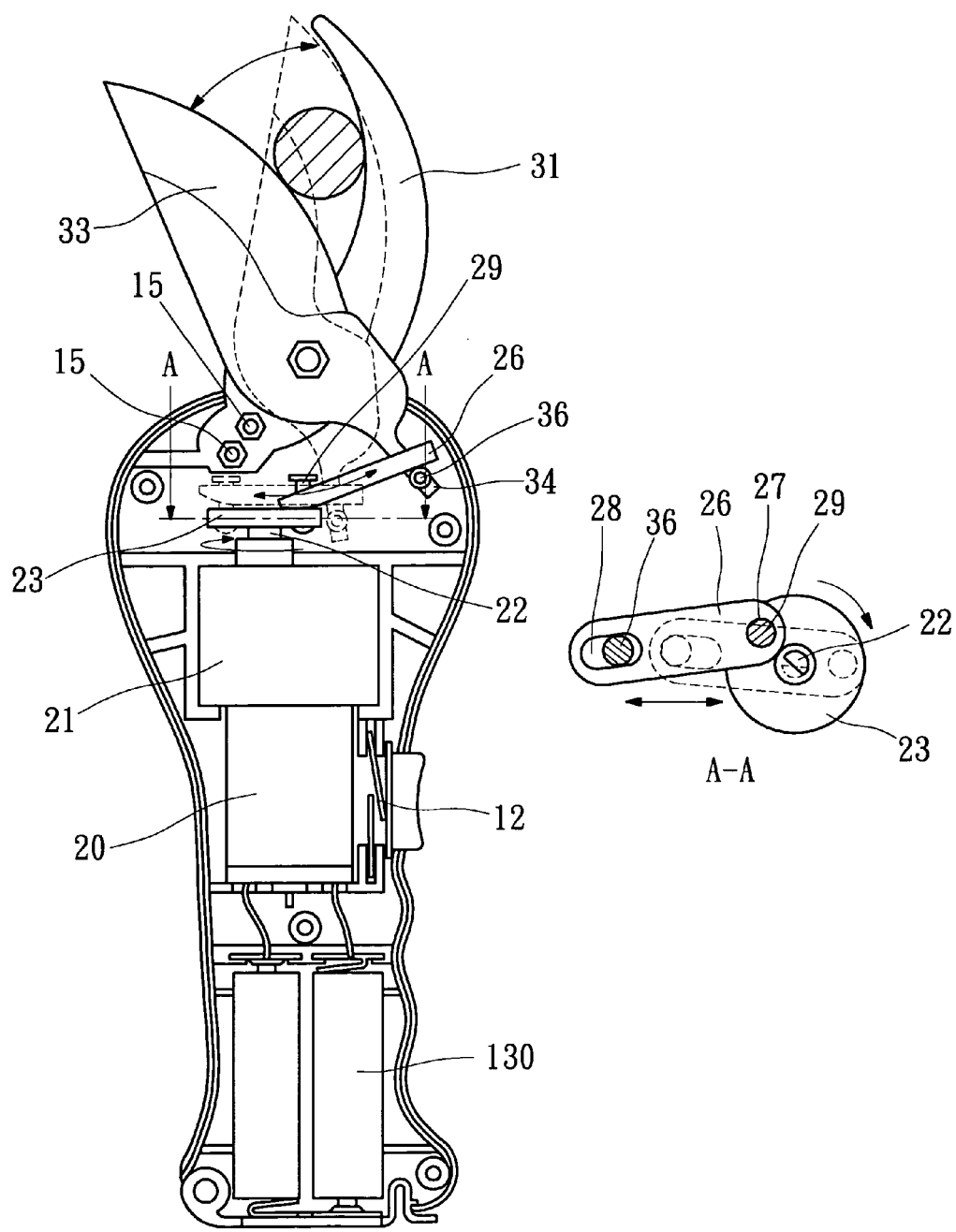
FIG. 3 is a schematic view of the present invention and Fig. A—A in FIG. 3 is a schematic view showing the operation of the present invention.

Referring to FIGS. 1, 2 and 3, the electric driving scissors of the present invention is illustrated. The electric driving scissors of the present invention includes the following elements.

A casing includes a first handle casing 10 and a second handle casing 11. A power switch 12 is installed on the casing, a battery groove 13 for receiving batteries 130, a receiving groove 14 for receiving a motor 20. The casing has a plurality of positioning rods 15 for assembling the fixed knife 31 of the cutting unit 30.

A motor 20 is installed with a speed change means 21 so as to provide a low speed rotation and a high tensional force through a rotary shaft 22.

A cutting unit 30 installed at a front end of the casing and has a fixed knives 31, and a movable knife 33. A distal end of the fixed knife 31 has positioning holes 32 for assembling positioning rods 15 of the casing; a distal end of the movable knife 33 is installed with a driving arm 34 which has an axial hole 35.

A crank 26 having two ends, each end has an axial hole 27 and another end thereof has a long pivotal hole 28 for assembling the driving arm 34 of the movable knife 33. A resisting rod 36 passes through the axial hole 35 of the driving arm 34 so that the driving arm 34 of the movable knife 33 is pivotally installed to the crank 26.

A driving disk 23 has a driving hole 24 at a center thereof. The rotary shaft 22 of the speed change means 21 of the motor 20 is assembled to the driving hole 24 of the driving disk 23. The driving disk 23 has an eccentric hole 25. An axial rod 29 passes through the axial hole 27 of the crank 26 and the eccentric hole 25 of the driving disk 23 so as to pivotally install the crank 26 to the driving disk 23.

The assembly, use, operation and use of the present invention will be described here. Referring to FIG. 3 and Fig. A—A in FIG. 3, when an object to be cut is placed between the two knives of the cutting unit 30, the power switch 12 is pressed to rotate the motor 20 and the speed change means 21 with a lower speed, and thus the driving disk 23 rotates in a low speed. Since the eccentric hole 25 of the driving disk 23 and the axial hole 27 of the crank 26 is connected by using the axial rod 29. The driving arm 34 inserts into the long pivotal hole 28 of the crank 26 so that the movable knife 33 is assembled to the crank 26. Thereby, the orientation of the crank 26 is changeable along the axial hole and moreover the crank 26 can move forwards or backwards (in the drawing, it moves rightwards and leftwards) and change the orientation thereof. Thereby, the crank 26 can drive the driving arm 34 of the movable knife 33. Thus, the movable knife 33 and fixed knife 31 can clip and cut the object therebetween.

In use of the present invention, it is only necessary to placed an object to be cut between the fixed knife 31 and the movable knife 33. Then the power switch 12 is pressed. Thereby, the rotary shaft 22 and the driving disk 23 connected thereto will rotate so that the crank 26 will push or pull the driving arm 34 and the movable knife 33 so as to complete a cut operation without using manpower.

Moreover, it should be noted that in the present invention, the motor 20 is installed with a speed change means 21 so that the rotation speed of the motor 20 can be reduced to a lower speed in the rotary shaft 22 with a higher torsion force. Thereby, a hard object can be cut. Furthermore, by the eccentric hole 25 of the driving disk 23, the axial hole 27 and pivotal hole 28 at two ends of the crank 26, the rotary shaft 22 of the motor 20 can rotate, while the crank 26 move linearly. Thereby, the angle of the movable knife 33 of the cutting unit 30 is changeable. This is one of the primary features of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric driving scissors comprising:
   a casing including a first handle casing and a second handle casing; a power switch being installed on the casing, a battery groove for receiving batteries, a receiving groove for receiving a motor; the casing having a plurality of positioning rods;
   a motor being installed with a speed change means so as to provide a low speed rotation and an high tensional force through a rotary shaft;
   a cutting unit installed at a front end of the casing and having a fixed knife, and a movable knife; a distal end of the fixed knife having positioning holes for assembling with the fixed knife to the positioning rods of the casing; a distal end of the movable knife being installed with a driving arm which has an axial hole;
   a crank having two ends, each end has an axial hole and another end thereof having a long pivotal hole for assembling the driving arm of the movable knife; a resisting rod passing through the axial hole of the driving arm so that the driving arm of the movable knife being pivotally installed to the crank; and
   a driving disk having a driving hole at a center thereof; the rotary shaft of the speed change means of the motor being assembled to the driving hole of the driving disk; the driving disk having an eccentric hole; an axial rod passing through the axial hole of the crank and the eccentric hole of the driving disk so as to pivotally install the crank to the driving disk;
   wherein by above components, rotation of the motor causes the crank to move so as to drive the knives of the cutting unit to change the angle between the two knives so as to cut an object placed between the two knives.

* * * * *